US008296956B2

(12) United States Patent
Battenfeld

(10) Patent No.: US 8,296,956 B2
(45) Date of Patent: Oct. 30, 2012

(54) PLIERS

(75) Inventor: Kurt Battenfeld, Ebsdorfergrund/Wittelsberg (DE)

(73) Assignee: Wezag GmbH Werkzeugfabrik, Stadtallendorf (DE)

( * ) Notice: Subject to any disclaimer, the term of this patent is extended or adjusted under 35 U.S.C. 154(b) by 790 days.

(21) Appl. No.: 12/189,740

(22) Filed: Aug. 11, 2008

(65) Prior Publication Data

US 2009/0044410 A1    Feb. 19, 2009

(30) Foreign Application Priority Data

Aug. 16, 2007  (DE) .................... 10 2007 038 626

(51) Int. Cl.
  *B21F 13/00*  (2006.01)
(52) U.S. Cl. ............................ 30/90.1; 30/90.3; 30/91.2
(58) Field of Classification Search .................. 30/91.2, 30/92, 90.3, 94, 108; 7/128; 72/409.16, 72/409.12; 29/751; 81/9.44, 9.42, 9.41
  See application file for complete search history.

(56) References Cited

U.S. PATENT DOCUMENTS

| | | | | |
|---|---|---|---|---|
| 2,121,752 A * | 6/1938 | Williams | ........................... | 30/92 |
| 2,452,734 A * | 11/1948 | Costelow | ....................... | 30/91.1 |
| 3,161,088 A * | 12/1964 | Tolman | ........................... | 81/9.44 |
| 3,333,491 A * | 8/1967 | Hurlbut | ........................... | 30/90.1 |
| 3,378,924 A * | 4/1968 | Porter | ........................... | 30/91.2 |
| 3,710,654 A * | 1/1973 | Halverson et al. | ............. | 81/9.44 |
| 3,822,470 A | 7/1974 | Hildebrand | | |
| 3,939,563 A * | 2/1976 | Deike | ............................ | 30/361 |
| 4,203,333 A * | 5/1980 | Campari | ........................ | 81/9.44 |
| 4,403,415 A * | 9/1983 | Kufrin | ............................ | 30/96 |
| 4,616,533 A | 10/1986 | Wiener et al. | | |
| 4,730,391 A | 3/1988 | Wood | | |
| 4,736,501 A * | 4/1988 | Fujimoto | ........................ | 29/33 F |
| 4,926,685 A * | 5/1990 | Shannon, Sr. | .............. | 72/409.11 |
| 4,979,299 A * | 12/1990 | Bieganski | ....................... | 30/90.1 |
| 5,074,043 A * | 12/1991 | Mills | .............................. | 30/91.2 |
| 5,153,984 A | 10/1992 | Beetz et al. | | |
| 5,572,911 A | 11/1996 | Schmode et al. | | |
| 5,913,933 A | 6/1999 | Beetz et al. | | |
| 6,053,025 A | 4/2000 | Beetz et al. | | |
| 6,058,606 A | 5/2000 | Hepworth | | |
| 6,131,289 A * | 10/2000 | Tarpill | ........................... | 30/90.6 |
| 6,155,095 A | 12/2000 | Beetz | | |
| 6,526,661 B1 * | 3/2003 | Shutts et al. | ................... | 30/90.1 |
| 6,612,147 B2 | 9/2003 | Beetz et al. | | |

(Continued)

FOREIGN PATENT DOCUMENTS

DE            2 019 959 A1    11/1971

(Continued)

OTHER PUBLICATIONS

European Search Report in co-pending related EP Application No. 08012277.3, mailed May 26, 2011.

*Primary Examiner* — Boyer D Ashley
*Assistant Examiner* — Omar Flores Sanchez
(74) *Attorney, Agent, or Firm* — Thomas, Kayden, Horstemeyer & Risley, LLP

(57) ABSTRACT

The present invention relates to pliers for removing an insulating layer of an electrical cable, in particular a coaxial cable. The inventive pliers comprise a cutting element. The distance of the cutting element from a seat for the cable is adjustable. Furthermore, the cutting element has a degree of freedom in a circumferential direction of the coaxial cable relative to the seat.

30 Claims, 8 Drawing Sheets

U.S. PATENT DOCUMENTS

| | | |
|---|---|---|
| 6,877,228 B2 | 4/2005 | Beetz et al. |
| 6,997,028 B2 * | 2/2006 | Schmode ................... 72/409.16 |
| 7,096,760 B2 * | 8/2006 | Schmode et al. ............... 81/9.41 |
| 7,694,420 B2 * | 4/2010 | Ehret et al. ..................... 30/90.1 |
| 2002/0056309 A1 | 5/2002 | Beetz et al. |

FOREIGN PATENT DOCUMENTS

| | | |
|---|---|---|
| DE | 40 23 337 C1 | 10/1991 |
| DE | 44 20 050 C1 | 8/1995 |
| DE | 198 02 287 C1 | 12/1998 |
| DE | 197 13 580 C2 | 12/1999 |
| DE | 100 56 900 C1 | 8/2002 |
| DE | 101 32 413 A1 | 1/2003 |
| DE | 698 31 996 T2 | 4/2006 |
| EP | 0 140 397 | 5/1990 |
| GB | 2 173 958 A | 10/1986 |
| GB | 2 215 143 A | 9/1989 |
| GB | 2 288 695 A | 10/1995 |

* cited by examiner

PLIERS

CROSS REFERENCE TO RELATED APPLICATIONS

This application claims priority to co-pending German Patent Application No. DE 10 2007 038 626.7 entitled "Zange zum Abisolieren eines Kabels", filed Aug. 16, 2007.

FIELD OF THE INVENTION

The present invention generally relates to pliers for partially removing the insulation of an electrical cable having a circular cross-section. A "cable" in the sense of the present invention is an electric conducting element with one or a plurality of wires wherein such cable comprises at least one layer, in particular a wire, core and/or an insulation that is rotationally symmetrical with respect to a longitudinal axis of the cable. It is also possible that a layer is built by a hollow cylindrical conducting element or a network or a braided conductor with a ring-like regular or irregular cross-section. The feature "cable" also covers wires, strands, braids, laces, flexes or any other types of conductive lines.

One type of application of inventive pliers is the preparation of a coaxial cable or coax cable for building an electrical connection. A coaxial cable might have an inner line made of metal (e.g. a copper core). Such inner core is covered by an insulating sheet or layer made of plastic (building a dielectric medium). The insulating layer is covered by a foil made of aluminum wherein the thickness of the foil might be in the range of some µm. The foil is surrounded by a network of wires or strands or a braided conductor. Such layer builds an electromagnetic shielding or a second conductive line in the coaxial cable. The network or braided conductor is again covered by an insulating layer made of plastic. Examples of coaxial cables are distributed as "RTK 031", "RG 174", "RG 58", "RG 59", or "RG 163". Such coaxial cables are used in any technical fields, in particular for vehicles, here as a cable for antennae. Furthermore, coaxial cables are used for domestic techniques or housing technologies, stereo equipment, television systems, satellite systems, IT-technologies or data transfer systems. For the use of such technologies and systems the end regions of the coaxial cables have to be linked with related devices, plugs, connectors, jacks and the like. For that purpose the single layers of the coaxial cable have to be uncovered with differing uncovered lengths. Uncovering one layer requires a removal of the adjacent outer layer which is usually done by carving or cutting the adjacent outer layer and sliding the carved end from the underlying layer. However, when carving or cutting the outer adjacent layer it is essential not to damage the underlying layer. Any damage of the underlying layer might impair the conductive properties, the insulation or the electrical shielding of that layer.

BACKGROUND OF THE INVENTION

GB 2 215 143 A discloses a device for removing an insulation of a cable, here a wire stripper adapted for being used for cables with a variety of diameters. The wire stripper comprises a pocket-like portion with a finger-hole extending through the body portion building a seat for the cable. A second body portion comprises a cutting element. The cutting element is introduced into the pocket built by the first body portion. The movement of the cutting element inside the pocket is supported by a spring element which is built by an elastic strap surrounding both body portions. With the cutting element completely moved inside the pocket built by the first body portion the cutting element completely closes the hole building the seat for the cable. Similar to a guillotine it is possible to completely cut the cable. Another hole building a second seat for a cable is provided adjacent to the first seat. A stop element for the movement of the cutting element limits the maximum of the movement of the cutting element such that the cutting element only partially covers the second seat. The free space in the second seat is dimensioned such that the cutting element carves the outer layer of a cable positioned within the second seat. For carving the entire circumference of the cable the wire stripper is rotated in circumferential direction with respect to the longitudinal axis of the cable. For completed carving of the insulation of the cable the cutting element is manually removed from the second seat with an increase of the bias of the spring element. The cable is removed from the seat and the carved layer is removed from the remaining part of the cable. Due to friction between the cable and supporting surfaces of the seat and between the cable and the cutting element during the carving process and the rotation of the wire stripper the cable moves within the seat. Due to the fact that the cutting blade of the cutting element is sloped with respect to the translational degree of freedom of the cutting element different directions of the rotation of the wire stripper with respect to the cable might result in different depths of the penetration of the cutting blade into the cable.

DE 195 43 390 C1 shows a wire stripper similar to the embodiment disclosed in GB 2 215 143 A wherein according to DE 195 43 390 C1 the two body portions are not moved with a translational degree of freedom but a rotational degree of freedom.

GB 2 173 958 A discloses a wire stripper wherein the cutting element is pivoted around a pivoting axis. A cable is held by a seat built by a bore with an orientation parallel to the pivoting axis. By a spring element the cutting element is pressed versus the outer sheet of the cable. Due to the bias of the cutting element by the spring element the cutting element penetrates into an insulating layer of the cable. The depth of penetration of the cutting element into the outer layer of the cable is limited by a stop element. The stop element is built with a cam. Manual rotation of the cam between three defined positions provides three different cutting depths of the cutting element. For carving or cutting the entire circumference of the cable the wire stripper is rotated around the longitudinal axis of the cable.

For the device for stripping cables known from DE 698 31 996 T2, corresponding to U.S. Pat. No. 6,058,606 A, the depth of cutting is adjusted by an adjusting unit. The adjusting unit comprises a stop element adjusting the effective region of the cutting blade. The cutting force depends on the energy stored in a spring pressing the cutting blade of the cutting element against the cable. The depth of penetration of the cutting blade into the cable depends on the length or angle of rotation of the rotational movement of the cutting element.

DE-OS 19 41 188 discloses pliers having two parts for stripping or removing the insulation of a coaxial cable. The two parts each comprise half-cylindrical recesses. The two half-cylindrical recesses combine to a cylindrical seat for the coaxial cable for closed parts of the pliers. Three cutting blades disposed one behind the other in axial direction of the seat are held in slots. The slots have an orientation transverse to the longitudinal direction of the seat. The three cutting blades extend with different cutting depths into the seat. The cutting edges might be straight, half-circular, V-shaped. A stop element limits the relative position of the front end of a coaxial cable positioned in the seat relative to the cutting blades. The pliers are intended for separately stripping three layers of a coaxial cable with one single step.

DE 91 04 414 U1 discloses multifunctional pliers wherein the pliers in one function are used for stripping a shielded coaxial cable. Handles of the pliers are fixedly connected with two halves of a cutting head of the pliers. The two parts of the pliers each built with a handle and a half of a cutting head are linked with each other for a pivoting movement around a pivoting axis. The two halves of the cutting head each comprise two parallel half-cylindrical recesses that combine for closed handles and closed head to two cylindrical seats for a cable. Cutting elements extend within the half-cylindrical recesses in a plane directed transverse to the longitudinal axis of the recess. The blade of the cutting element is half-circular having an inner diameter smaller than that of the recesses. With the closure of the head of the pliers the cutting blades combine to a approximately circular blade. Via a closing movement of the pliers a circumferential cut or carving is provided in the coaxial cable. For stripping different layers of one coaxial cable a plurality of cutting elements for different cutting depths is used. A diameter of a first cutting element correlates with the copper core of a coaxial cable. The diameter of a second cutting element correlates with the outer diameter of the insulating layer covering the copper core. The diameter of a third cutting element is chosen such that an electrical shielding of the cable is uncovered but not damaged. Additionally each half of the head of the pliers is equipped with a jaw for crimping a plug with the cable.

DE 69 22 349 U discloses a device for stripping coaxial cables. The device comprises a rotatable holding device having a cutting element which is movable in radial direction. For carving the entire circumference of the coaxial cable it is necessary to rotate the holding device and the cable held by the holding device.

EP 0 140 397 B1, corresponding to U.S. Pat. No. 4,616,533 A, discloses a device only used for stripping a coaxial cable. A holding device clamps the coaxial cable. A unit built with a carrier for the cutting blade and a guiding member are rotated by means of a crank arm in circumferential direction for carving the coaxial cable in circumferential direction.

SUMMARY OF THE INVENTION

The present invention relates to pliers providing the option of a multifunctional use of the pliers for the preparation of an electrical cable. Furthermore, the present invention relates to the manufacturing process for pliers, the different types of use of pliers and the stripping properties of pliers.

For stripping devices known from prior art the cutting element has a variable radial distance from the seat for the cable. However, in circumferential direction of the cable the cutting element is usually fixedly linked with the seat. For these embodiments known from prior art a circumferential carving or cutting of the cable requires a rotation of the cutting element, the seat and the whole pliers with an angle of 360° around the longitudinal axis of the cable. Such rotational movement is awkward to do for the user and is not possible in small spaces.

According to the invention, the cutting element might have a degree of freedom in circumferential direction with respect to the seat and the cable located in the seat. During the step of providing the circumferential carving the pliers might be held without any rotation of the pliers itself. However, the cutting element is moved in circumferential direction or rotated around the longitudinal axis of the seat resulting in a simplified use that is in particular also possible in small spaces.

Furthermore, for the stripping tools known from prior art the cable has to be clamped between supporting surfaces of the device and the cutting element. These embodiments require that the clamping force correlates or equals with the force pressing the cutting element against the cable. When rotating the whole device according to the embodiments known from prior art frictional forces between the cable and the supporting surfaces and the cutting elements lead to a torsional or drilling force acting upon the cable. Such drilling forces are undesired. For a rotation of 360° also the cable is drilled with a drilling angle of 360° or a slipping motion between the cable and the supporting surfaces has to be provided.

According to the invention, it is possible to partially or completely avoid the aforementioned frictional forces or slipping movement between the seat, supporting surfaces and the cable. This is due to the fact that it is possible that the seat is not rotated throughout the cutting or carving process. Furthermore, it is possible that during the rotation of the cutting element according to the invention the force applied by the cutting element also rotates leading to a rotating counterforce applied by the seat. The drilling deflection of the cable is avoided also without any slipping movement between the supporting surfaces and the cable. Furthermore, it might be possible that frictional forces directed in circumferential direction during the rotation of the cutting element are counteracted by frictional forces at the supporting surfaces of the seat. The counterforces are located with a small axial distance but on the opposite side of the cable so that there is no or only a small drilling of the cable.

The seat itself might have any design. The seat might have one single supporting surface or a plurality of supporting surfaces with any contour, might be built with at least one recess, a cylindrical, conical or stepped opening or bore or with a plurality of ribs or extension in radial inner direction. The seat or the supporting surfaces might be rigid or elastic in radial direction for clamping the cable. It is also possible that the seat is adjustable in radial direction by means of suitable adjusting elements so that contact surfaces might be brought in contact with the outer circumference of the cable. The seat might contact the entire circumference of the cable or only one or a plurality of portions of the outer circumference of the cable. In longitudinal direction of the cable the contact region between seat and cable might have a longitudinal extension or might be only one single contact point. Furthermore, in a longitudinal sectional view a contact surface might have a contour which is straight and parallel to the longitudinal axis of the cable or might have any curved contour so that the distance of the contact surface varies over the longitudinal extension of the cable. Any seat of the aforementioned types might be used for holding the cable within the pliers in a fixed position and orientation during the cutting or carving process of the cutting element.

The cutting element might be built by any material providing a sufficient stiffness or hardness for cutting or carving the relevant layer of the cable. The cutting element comprises any suitable geometry having any known contour of the cutting edge in a section directed in longitudinal direction of the seat. Also in a cross-section the cutting blade or the cutting element might have any known contour. To give only some examples, the cutting element might be built by a circular plate having a curved convex cutting edge, might be built as a knife with a straight cutting blade or might be slightly convex or concave or the cutting blade might be concave with the shape of a segment of a circle wherein the diameter of the circle equals the diameter of the cut to be introduced into the cable.

The radial distance of the cutting element from the seat for the cable is variable wherein a reduction of the radial distance of the cutting element leads to a cutting or carving of the cable located within the seat. For the carving or cutting process of the cable different mechanisms might be used:

According to a first embodiment of the invention, the cutting element is moved to the desired cutting distance in radial direction without any movement of the cutting element in circumferential direction. Thus, the decrease of the radial distance provides the full cutting depth in a segment of the circumference of the cable. Following this first step of reducing the radial distance of the cutting element from the cable, the cutting element is moved in circumferential direction. During this step the carving or cutting with constant depth is extended in circumferential direction.

For a different embodiment the cutting element might be pressed with a defined radial force in radial direction versus the cable. The radial force might not result in any carving or cutting or might result in a carving or cutting of the cable with a depth smaller than the final depth. During the subsequent relative movement of the cutting element in circumferential direction the cutting element is still pressed in radial direction against the outer circumference of the cable continuing the carving or cutting in circumferential direction and/or increasing the depth of the cutting or carving. For such embodiment, it is possible that the depth of the carving or cutting is increased with a relative rotation between the seat and the cable and the cutting element of more than 360° wherein an increase of the angle of rotation is related with an increase of the depth of the carving or cutting.

Also mixed embodiments of the two aforementioned different types are possible. In case of the pressing force of the spring being large enough for immediately providing the desired depth of cutting or carving also without any fixation of the radial distance between the cutting element and the cable a rotation with an angle of rotation of 360° might immediately provide the entire carving or cutting with the desired depth. On the other hand, also a fixation of the radial distance between the cutting element and the cable might require an angle of rotation of more than 360° which is in particular the case for cutting a layer made of a foil of aluminum having a very small thickness.

The present invention might also provide a centering element. By means of such centering element, the position of the cable in the seat relative to the path of the cutting element might be centered. This is in particular of importance for producing a circumferential carving or cutting concentrically to the longitudinal axis of the cable. In the simplest case, such centering element is built by the contact surface(s) of the seat, e.g. by tapered or conically shaped contact surfaces or contact surfaces having a decreasing distance for increasing penetration of the cable into the seat. It is also possible that the seat is built with a partial or complete bore having a tapered or conical bezel or shoulder.

The change of the radial distance between the seat and the cutting element might be provided by a degree of freedom of the seat relative to the pliers versus the cutting element. However, it is also possible that the radial distance between the cutting element and the seat is varied by a movement of the cutting element with respect to the pliers. The movement of the cutting element might be a translational movement in radial direction wherein the cutting element might be guided by suitable guidances, grooves, channels and the like. However, it is also possible that the cutting element is pivoted around a pivoting axis directed parallel to the longitudinal axis of the cable and spaced from the cable.

In order to avoid an undesired depth of the cutting or carving, another embodiment of the invention suggests providing a stop element limiting the minimal radial distance of the cutting element from the seat.

In particular in case of a spring element biasing the cutting element in radial outer direction the inventive pliers might have a stop element limiting the maximal radial distance of the cutting element from the seat.

The use of a spring element pressing the cutting element in radial inner direction against the outer circumference of the cable might per se be used for cutting or carving the cable and/or for increasing the depth of a cutting or carving. However, it is also possible that also the movement of the cutting element in circumferential direction is responsible for the cutting and carving. Additionally to the force of the spring, a manual force might press the cutting element in inner direction. A feeding position for introducing the cable into the seat or a removal position for removing the cable from the seat might be provided. In case of a spring element pressing the cutting element in radial inner direction such feeding position is provided manually moving the cutting element in radial outward direction with an increase of the bias of the spring.

According to another embodiment the spring element biases the cutting element in radial outward direction. For such embodiments, the position of the cutting element with unloaded spring element builds the feeding position or removal position of the pliers. For the cutting or carving process manual forces have to be applied to the cutting element for reducing the radial distance from the feeding position to a cutting position.

According to another aspect of the invention, the pliers comprise a locking or resting unit for fixing the distance of the cutting element from the seat in a cutting position. Such resting or locking unit might guarantee a cutting or carving in circumferential direction with constant depth.

For uncovering a layer with a cutting or carving having a given distance from the front surface of the cable the present invention suggests providing a positioning unit determining the axial distance of the cutting element from the front surface of the cable. In the simplest embodiment, such positioning unit is built by a protrusion, shoulder or tapering of the seat.

In another aspect of the invention, an ejection unit is provided for ejecting, pushing or sliding the cable or cut or carved parts or layers of the cable at the end of the cutting process out of the pliers. By means of the ejecting unit an awkward removal of cut residues out of the seat might be avoided.

It is also possible that the relative movement between the cutting element and the seat is manually activated. A more comfortable use of the pliers is given in case of providing a drive unit for the activation of the relative movement between the cutting element and the seat. The drive unit might be built by a transmission activated by the handles of the pliers or any other suitable drive mechanism.

In case that it is of interest to uncover a plurality of layers of the cable with cuttings or carvings of different depths with one single radial movement and/or one single movement in circumferential direction the invention suggests providing a plurality of cutting elements at a plurality of axial positions of the seat. The plurality of cutting elements are movable in a linked movement relative to the seat and cable.

The functionality of the pliers might be increased in case of providing a set with exchangeable head parts. Different head parts might be used for different working steps for preparing the electrical cables. Furthermore, it is possible to provide a head part that is related with works independent on the preparation of the electrical cable. According to one example, a first head part is used for stripping the cable or removing an insulation of the cable, whereas a second head part is used for crimping a plug with the cable. Furthermore, it is possible to provide a plurality of head parts for cables of different diameters and/or types. A set of pliers with different head parts might be stored and transported and used in a kind of bag, case of box.

Additionally to the mentioned cutting element, the pliers or a head part might have another cutting element that is used by an activation separate from the activation of the first cutting element. The different cutting elements might be used for providing cuts or carvings of different depths for the same cable or for a plurality of cables.

For other inventive pliers, a separating unit is provided. The separating unit might be activated by the handles and is used for a plane and complete cutting of the cable. Such plane and complete cutting might be used as a first step in the stripping process for the preparation of the front surface of the cable for the subsequent removal of a layer of the cable.

In case that the pliers are used with the same head part or another head part for a crimping process after stripping the cable, the invention suggests providing an automatic locking mechanism for crimping a work piece in a plurality of printing steps, see the automatic locking mechanism described in U.S. Pat. No. 5,913,933.

The present invention might be used in connection with pliers of any type. To give some examples, the invention might be used in connection with pliers of the applicant according to documents DE 40 23 337 C1 (corresponding to U.S. Pat. No. 5,153,984 A); DE 44 27553 A1; DE 100 56 900 C1 (according to U.S. Pat. No. 6,612,147 B2); DE 101 32 413 A1 (according to U.S. Pat. No. 6,877,228 B2); DE 101 40 270 B4; DE 197 13 580 C2 (according to U.S. Pat. No. 5,913,933 A); DE 198 02 287 C1 (according to U.S. Pat. No. 6,053,025 A); DE 198 32 884 C1 (according to U.S. Pat. No. 6,155,095 A), with the kinematics, the crimping conditions and states, degrees of freedom and linking conditions and inserts and seats described in these documents.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

The embodiments of pliers shown in the figures are only examples for the type of pliers used, the kinematics used for producing the forces, the absolute and relative dimensions, the configuration of the cutting element, the position of the cutting element at the pliers and the linkage, the use and the type of the used automatic locking unit, the degrees of freedom of the movement of the head parts of the pliers, in particular the pivoting movement with the pivoting movement of the handles or a translational displacement activated by a pivoting movement of the handles, the configuration of the head part, the configuration of the built seat and the configuration of the cutting element itself. For giving only some examples for a variety of possible embodiments, the cutting element might be used in connection with a tool of the applicant according to the documents DE 40 23 337 C1, corresponding to U.S. Pat. No. 5,153,984 A; DE 44 27 553 A1; DE 100 56 900 C1, according to U.S. Pat. No. 6,612,147 B2; DE 101 32 413 A1, according to U.S. Pat. No. 6,877,228 B2; DE 101 40 270 B4; DE 197 13 580 C2, according to U.S. Pat. No. 5,913,933 A; DE 198 02 287 C1, according to U.S. Pat. No. 6,053,025 A; DE 198 32 884 C1, according to U.S. Pat. No. 6,155,095 A. Furthermore, for the cutting unit generally features disclosed in documents DE 698 31 996 T2, DE 195 43 390 C2, GB 2 215 143 A, DE-OS 19 41 188 or DE 91 04 414 U1 might be used, e.g. features relating with the contour of the cutting blade and the cutting edge, the provision of a force pressing the cutting element against the cable and the like.

Figure 1:
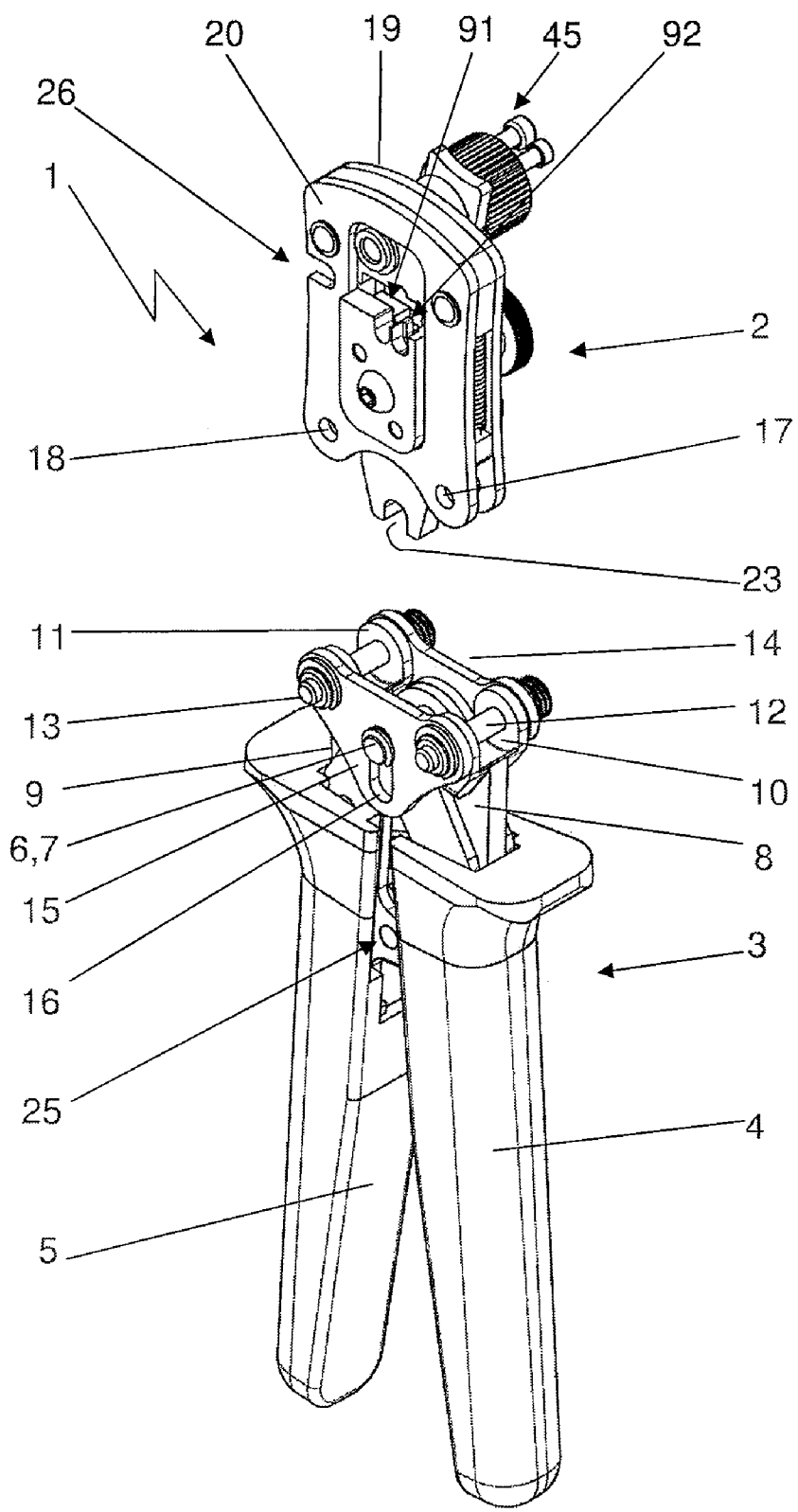
FIG. 1 is a three-dimensional view of pliers according to the invention showing the head part of the pliers disassembled from an activating unit.

FIG. 1 shows an embodiment of inventive pliers 1, wherein the head part 2 is disassembled from the activating unit 3.

The activating unit 3 comprises two handles 4, 5 that are pivotable around the pivoting axis 6. For providing the pivoting axis two bearing extensions of the end regions of the handles comprise coaxial bores with a pin 7 extending therethrough. A further link of the handles 4, 5 is built with pulling elements 8, 9 having fork-like end regions 10, 11, connecting pins 12, 13 and plate-like yokes 14, 15 as follows: the pulling elements 8, 9 are pivotably linked at their lower end regions with the handles 4, 5 for a pivoting movement around a pivoting axis directed parallel to the pivoting axis 6. In the opposite end regions the pulling elements 8, 9 comprise bores in the region of the fork-like end regions 10, 11. The bores are arranged coaxially to the respective bores of the transverse yokes 14, 15. The connecting pins 12, 13 are introduced into the bores of the fork-like end regions 10, 11 as well as the transverse yokes 14, 15 and secured, e.g. by means of a head of the connecting pins 12, 13 and a retainer ring in the end region opposite to the head of the pins 12, 13. The transverse yokes 14, 15 are parallel to each other building an interspace wherein the end regions of the handles 4, 5 are located. The transverse yokes 14, 15 have elongated holes 16 extending in the direction of a central longitudinal axis of the pliers 1. The longitudinal holes 16 build a guidance for the pressure pin 7.

The connecting pins 12, 13 are positioned in a plane that is horizontally in FIG. 1. A pivoting movement of the handles 4, 5 towards each other results in a decrease of the distance of the pressure pin 7 from the aforementioned plane. For securing a reached pivoting angle, thus for securing a given distance of the pressure pin 7 from the plane determined by the connecting pins 12, 13 an automatic locking unit 25 is interposed between the handles 4, 5, wherein the general configuration of such automatic locking units is described in the mentioned other patent applications of the applicant. The automatic locking unit 25 divides the entire pivoting angle of handles 4, 5 towards each other in a plurality of small partial pivoting angles. Once a pivoting position within a certain partial pivoting angle is reached, such position is secured by the automatic locking unit. Unlocking of the automatic locking unit 25 automatically occurs when reaching the minimum opening angle of the handles 4, 5 or for manual manipulation of the automatic locking unit 25.

For connecting the head part 2 with the activating unit 3, the connecting pins 12, 13 are partially pulled out off the activating unit 3 from their position shown in FIG. 1. The head part 2 is inserted from the upper side into the activating unit 3 such that bores 17, 18 of a frame 19, 20 being approximately O-shaped are aligned with the respective bores of the transverse yokes 14, 15 and the bores of the end regions 10, 11 of the pulling elements 8, 9. In such position, the connecting pins 12, 13 are passed through the aligned bores of the end regions 10, 11, the bores of the transverse yokes 14, 15 and the bores 17, 18 of the frames 19, 20 and secured in axial direction. The head part 2 has a plate-like design built with the frames 19, 20. The frames 19, 20 have a generally identical design. As can be seen from FIG. 2, between the frames 19, 20 there are located two working jaws 21, 22. The working jaw 21 is a fixed jaw, wherein e.g. a fixed connection between the working jaw 21 and the frames 19, 20 is built by rivets. By the fixed jaw the frames 19, 20 are held to a distance corresponding to the thickness of the working jaw 21 and are fixed in parallel orientation. The working jaw 22 is movable in a lifting direction 24 with a translational degree of freedom corresponding to the central longitudinal axis of the pliers 1. The movable working jaw 22 protrudes downwards out off the head part 2 and comprises a partially open approximately U-shaped recess 23. With the introduction of the head part 2 into the activating unit 3 the pressure pin 7 enters into the recess 23 and contacts the basis of the recess 23. However, it is also possible that in the assembled state of the head part 2 and the activating unit 3 first the pressure pin 7 does not contact the base of the recess 23. The contact between the pressure pin 7 and the base of the recess 23 is then established with a decrease of the opening angle of the handles 4, 5. Protrusions limiting the recess 23 transverse to the lifting direction 24 build lateral guidances for the pressure pin 7 in recess 23.

The working jaws 21, 22 have a correlated design and build e.g. a tool for pressing, cutting, crimping, building a closable seat and the like. Spring elements, here compression springs acting in lifting direction, are interposed between the working jaws 21, 22. For unlocked automatic locking unit 25 the spring elements bias the working jaws 21, 22 versus an increase of their distance. Such position with an increased distance of the working jaws 21, 22 is of advantage for unloading a worked work piece or for introducing a new work piece to be worked.

Figure 2:
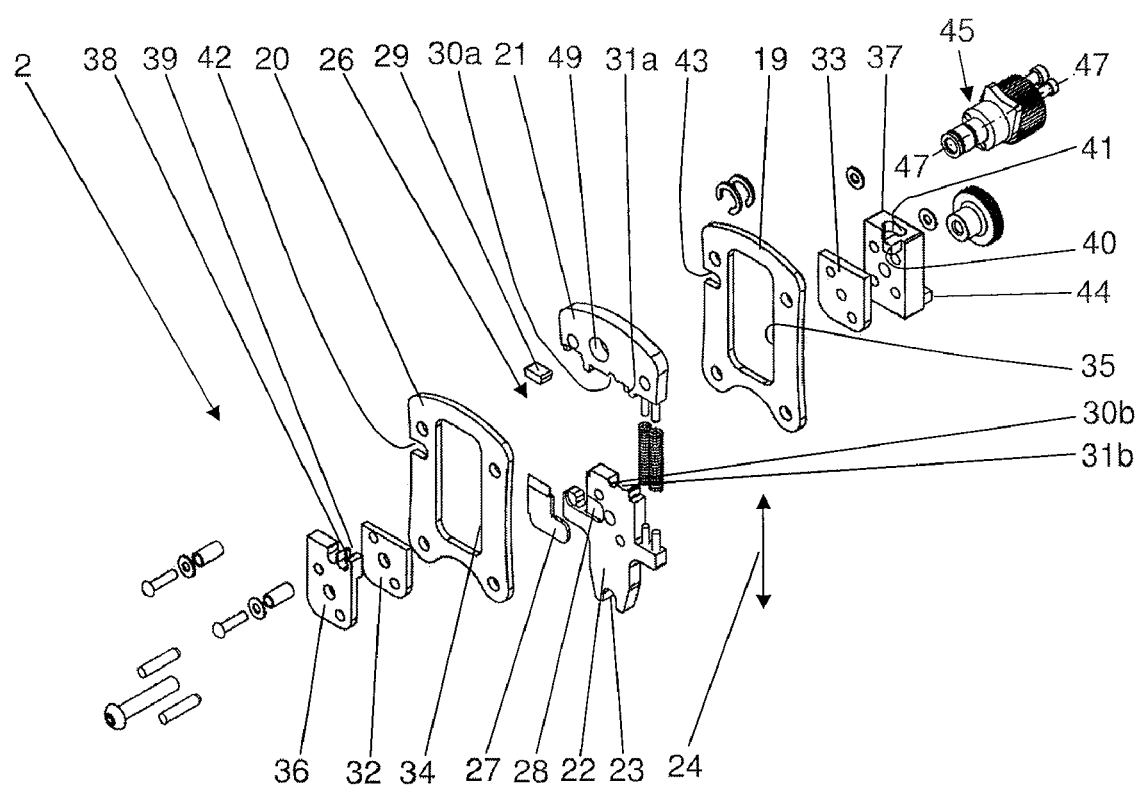
FIG. 2 shows the head part of the pliers in an explosional three-dimensional view.

For the embodiment shown in FIGS. 1 and 2, the working jaws 21, 22 build the following tools:

A separating unit 26 is used for a plane cut of a cable. For that purpose a blade 27 is fixedly connected with the movable working jaw 22. For the embodiment shown in FIG. 2, the blade 27 has a straight cutting edge. The blade 27 is approximately L-shaped in a plan view. The movable working jaw 22 comprises a recess 28 adapted to the outer contour of the part of the L-shaped blade 27 opposite to the cutting edge. The L-shaped blade 27 is inserted into the recess 28. The blade 27 is secured against a removal from the recess 28 by frame 20 that presses the blade 27 against the basis of the recess 28. The cutting edge of blade 27 protrudes upwards from the movable working jaw 22. Opposite to the cutting edge of blade 27, a cutting anvil 29 is inserted into the fixed working jaw 21. For completing the closing movement, blade 27 is pressed against the cutting anvil 29 finishing the cutting movement for a plane complete cut of a cable. The cutting anvil 29 is preferably made of an elastic material or a material having a lower hardness than the cutting edge of blade 27 leading to an elastic deformation of the cutting anvil 29 when closing the separating unit 26. The cutting anvil 29 might—similar to blade 27 for the moved working jaw 22—be inserted into an adapted recess of the fixed working jaw 21 and might be secured by frames 19, 20 against removal.

The working jaws 21, 22 have couples of cutting halves 30, 31, wherein cutting halves 30*a*, 31*a* are provided at the working jaw 21 and cutting halves 30*b*, 31*b* are provided at the working jaw 22. The cutting halves 30*a* and 30*b* as well as 31*a* and 31*b* combine to a circumferential cutting edge with the closure of the working jaws 21, 22, wherein the circumferential cutting edge is preferably approximately circular. The cutting halves 30, 31 might in the closed state build cutting edges of different diameters.

Guided plates 32, 33 are connected with the movable working jaw 22, in particular by threading. With a close fit the guided plates 32, 33 are received in recesses 34, 35 of the frames 19, 20. During the movement of working jaw 22 in lifting direction 24 a guidance of the guided plates 32, 33 is given by the vertical parallel limiting surfaces of the recesses 34, 35. The guided plates 32, 33 provide a guidance for the working jaw 22.

Furthermore, at the exterior of the guided plates 32, 33 positioning means 36, 37 might be mounted:

A positioning means 36 is located at that side of the head part 2 from where the cable is introduced into the locator. The positioning means 36 comprises U-shaped recesses 38, 39 having an opening with a width corresponding to the diameter of a layer that is to be carved or cut in the process of stripping the cable. The base of the recesses 38, 39 corresponds to the segment of the outer circumference of a cylinder, wherein the longitudinal axis of said cylinder is directed versus the midpoint of the cutting edge built by the cutting halves 30, 31. The positioning means 36 is primarily used for aligning the cable in axial direction and for a guidance of the cable.

On the other side of the head part 2 there is another positioning means 37. The positioning means 37 comprises stop elements 40, 41 located behind the partially cylindrical recesses 38, 39 at the aforementioned longitudinal axes. The stop element 40 is built by an extension of the positioning means 37 extending through the recess 35 with a given distance of the cutting halves 31*a*, 31*b*. The given distance corresponds to the length of the part of the layer to be removed or stripped. The stop element 41 is located behind the plane defined by the outer surface of frame 19 for building a stop for a larger stripping length.

The afore-described pliers might be used for removing a layer or an insulation as follow:

In a first working step, a coaxial cable is inserted into the separating unit 26 for opened handles. The U-shaped recesses 42, 43 of frames 19, 20 are aligned with each other in the region of the separating unit. For opened handles 4, 5 the blade 27 has a maximal distance from the cutting anvil 29. A cable is then introduced through the recess 42, the space between blade 27 and cutting anvil 29 and through recess 43 by an axial movement or lateral movement. With the closing movement, the blade 27 approximates the cutting anvil 29. For the complete closure of the handles 4, 5 the coaxial cable is completely cut with a smooth cutting plane.

In a next working step, the coaxial cable is then introduced into the larger recess 38 of the recesses 38, 39 from the front side. For opened handles the coaxial cable is further introduced in axial direction through the space between the jaws 21 until the front surface of the coaxial cable abuts the stop element 41 of the positioning means 37. In such position of the coaxial cable, the handles 4, 5 are closed coinciding with the cutting halves 31a, 31b approximating each other. At the end with the completion of the closing movement the entire circumference of the outer layer of the coaxial cable comprises a cut or carving. Pulling the coaxial cable out off the pliers for closed working jaws 21, 22, the cutting halves 30a, 30b retain the separated and cut layer so that the coaxial cable is freed from the stripped part of the layer. The length of the stripped part of the layer is predetermined by the distance of the cutting halves 30a, 30b from the stop element 41. However, it is also possible to open the pliers and remove the coaxial cable from the pliers and to manually remove the part of the outer layer cut off from the remaining parts of the coaxial cable.

In a next working step (that generally corresponds with the former step) the coaxial cable is inserted with a remaining inner freed layer into recess 39 by moving the cable in axial direction into the pliers until the front surface of the coaxial cable abuts stop element 40. With a closing movement of the working jaws 21, 22 the cutting halves 31a, 31b cut or carve the layer freed in the former step for stripping a part of that layer. The length of the stripped part of that freed layer is given by the distance of the cutting halves 31a, 31b from the stopping element 40.

According to another embodiment of the invention, the positioning means 37 is designed and arranged to be turned and used in two turned positions. For different desired lengths of the stripped parts of the layer of the cable the positioning means 37 is turned and connected with the pliers so that instead of a stop element 40 a stop element 44 leading to a different length comes into force. A cutting unit 45 is provided having a cutting element 46 or a blade which is rotatable relative to the pliers 1 about a longitudinal axis 47-47 independent on the pivoting movement of the handles 4, 5. For the shown embodiment, the cutting element 46 comprises a cylindrical extension 48. The extension 48 might be inserted with a transition fit or snug fit or loose fit through the recesses 34, 35 into the through hole 49 of working jaw 21. The cylindrical extension 48 comprises two circumferential grooves 50, 51 wherein the distance of the grooves 50, 51 correlates with the thickness of the working jaw 21. The cutting unit 45 when inserted into bore 49 is in axial direction secured by two locking rings inserted into grooves 50, 51 permitting a rotational movement of the cutting unit 45 with respect to working jaw 21 around the longitudinal axis 47-47.

Extension 48 is part of a base body 52 of the cutting unit 45. The base body 52 has a longitudinal bore having an increase of the diameter located approximately in the middle. The increase of the diameter of the through hole 53 is built by a centering means 54 built by a beveled edge or shoulder.

Figure 3:
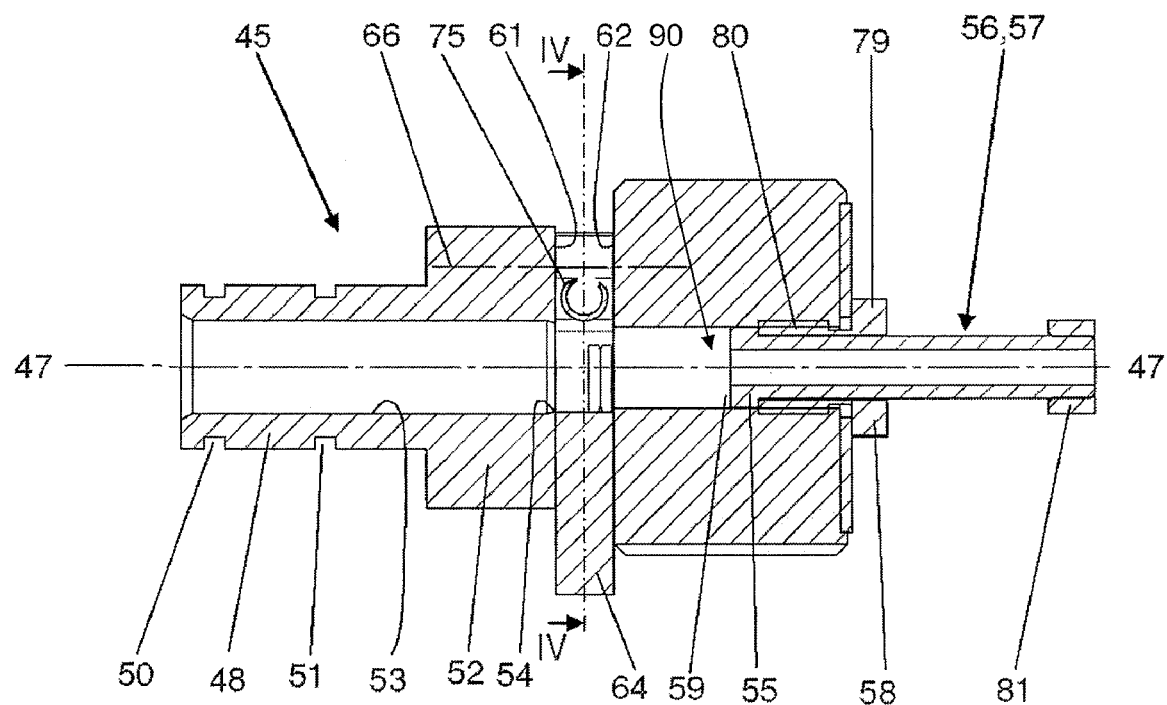
FIG. 3 shows a cutting unit in a longitudinal section III-III.

A cylindrical end region 55 of an ejecting stem 56 building a part of the ejecting unit 57 is located in the through hole 53 in close fit such that the ejecting stem 56 might slide in longitudinal direction. FIG. 3 shows the position of the ejecting stem 56 with the largest extension out off the through hole 53. Such position is secured by a stop element. For the shown embodiment, the stop element is built with a final nut 58 screwed with the base body. The different diameters of the through hole 53 and the opening angle of bevel 54 are chosen such that the coaxial cable might be introduced after the cutting step of the separating unit 23 with its maximal outer diameter into the through hole 53. Such introducing movement is centered by bevel 54. The front surface 59 of the coaxial cable then abuts the ejecting stem 56. At the end of the introducing movement of the coaxial cable into through hole 53 the front surface of the coaxial cable presses the ejecting stem 56 against the stop element built by the nut 58. The front surface 59 of the ejecting stem 56 limits the distance for introducing the front surface of the coaxial cable with the ejecting stem 56 being moved as far as possible outside the base body 52. So the front surface 59 is part of a positioning unit 90.

Furthermore, the base body adjacent bevel 54 comprises a milled recess extending approximately over ¾ of the circumference and joining with the through hole 53. According to FIG. 4, only a circular ring segment 60 with an extension in circumferential direction of approximately 90° remains. Such circular ring segment for the orientation according to FIG. 4 extends from a 9 o'clock-position to a 12 o'clock-position.

Remote from the circular ring segment 60 the base body 52 has parallel limiting walls 61, 62 limiting a housing space for cutting element 63 with a related holding and guiding unit 64.

For the shown embodiment a pin 65 defining a pivoting axis 66 extends in parallel orientation to the longitudinal axis 47-47 into the space between the limiting walls 61, 62. With a bore the holding and guiding unit 64 is supported against pin 65 for a pivoting movement around pivoting axis 66. Furthermore, the guiding and holding unit 64 is supported by the limiting walls 61, 62 so that there is only a pivoting degree of freedom for the holding and guiding unit 64.

In a first approximation the holding and guiding unit 64 is L-shaped, V-shaped or comprises the shape of a segment of a circular ring with an extension in circumferential direction of 270°. The pin 65 is linked in an end region of the holding and guiding unit 64. The maximum of the pivoting movement of the holding and guiding unit 64 in inner direction is limited due to the fact that the end region of the holding and guiding unit 64 opposite to the pin 65 abuts with the limiting surface of the circular ring segment 60. Such limiting surface builds a stop element 67 for limiting the maximal movement of the holding and guiding unit 64 in radial inner direction. In such end position the bore 68 of the base body and a bore 69 of the holding and guiding unit 64 (located in the end region of the holding and guiding unit opposite to the pin 65) are aligned with each other. A resting or locking unit 70, here built with a locking pin 71, might be manually introduced into bores 68, 69 or automatically moves into bores 68, 69 locking the holding and guiding unit 64 in the described end position.

The holding and guiding unit 64 holds the cutting element 63. In the shown embodiment, the cutting element 63 has a straight cutting edge 72. For the shown embodiment, the cutting element 63 is approximately O-shaped, wherein the cutting edge 72 protrudes from the outer contour versus the longitudinal axis 47-47. The holding and guiding unit 64 comprises a recess with a contour corresponding to the O-shaped outer contour of the cutting element 63. Inserting the cutting element 63 into the recess of the holding and guiding unit 64 fixes the orientation of the cutting element 63 with respect to the holding and guiding unit. A fixation of the cutting element 63 in the direction of the longitudinal axis 47-47 against a removal of the cutting element 63 from the holding and guiding unit 64 is provided by a fixation element 73, e.g. a screw, a rivet or a dowel pin. The holding and guiding unit 64 comprises an inner recess 74 dimensioned such that it is guaranteed that over the entire pivoting angle of the holding and guiding unit 64 the holding and guiding unit 64 does not enter into the open cross-section of the through hole 53. Accordingly only the cutting edge 72 of the cutting element 63 contacts the cable located in the through hole 53. Furthermore, the holding and guiding unit 64 in the end unit adjacent pin 65 comprises a contour such that the desired pivoting angle of the holding and guiding unit 64 with respect to the circular ring segment 60 is guaranteed.

Figure 4:
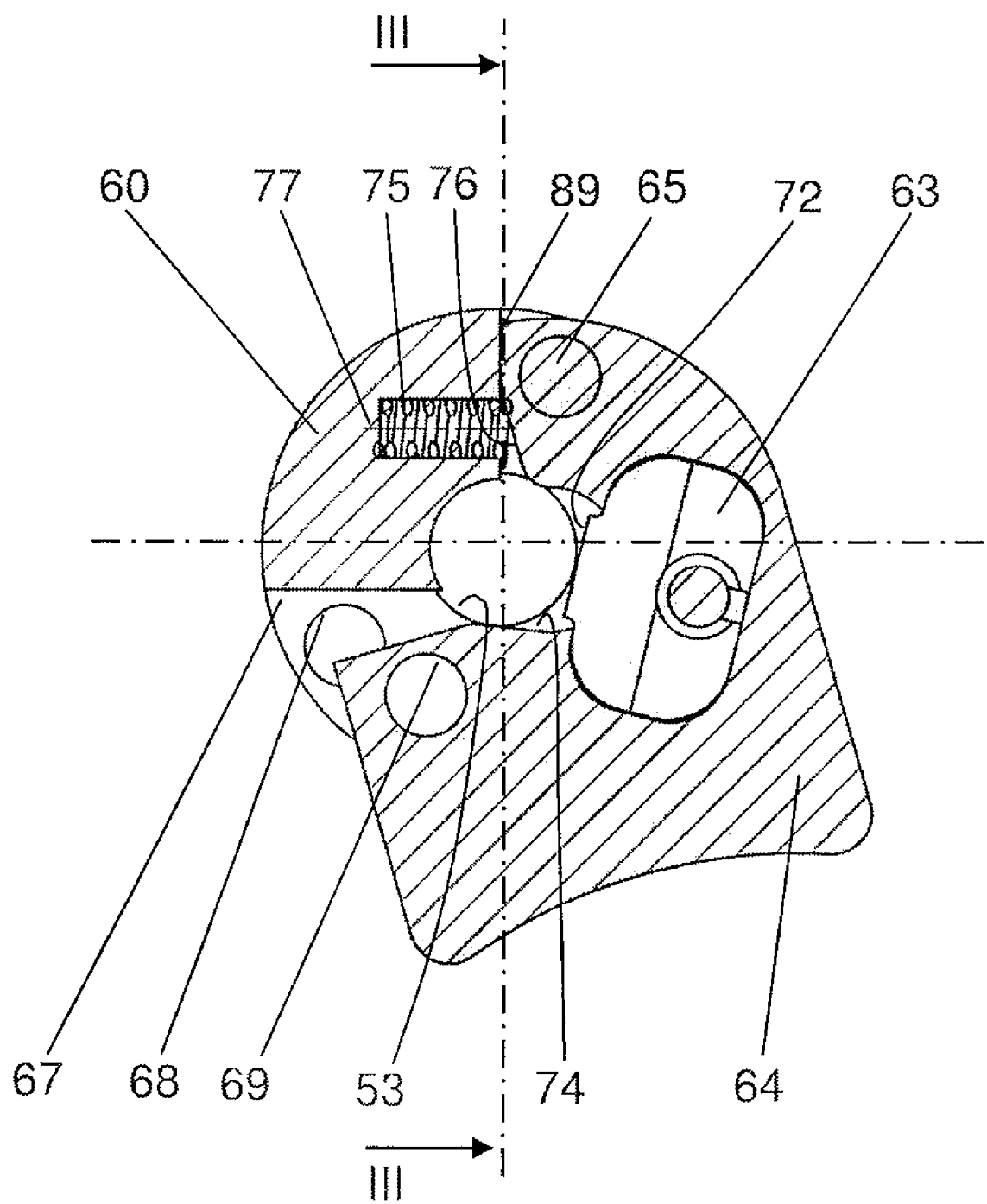
FIG. 4 shows the cutting unit according to FIG. 3 in a cross-section IV-IV.

FIG. 4 shows an embodiment, wherein a compression spring 75 is located within a bore having its longitudinal axis 77 in the shown cross-section. One end region of the compression spring 75 is supported by a front surface 76 of the holding and guiding unit 64 adjacent to the pin 65. The compression spring 75 is biased for any effective pivoting angle of the holding and guiding unit 64. The longitudinal axis 77 of the compression spring 75 comprises a lever arm with respect to the pivoting axis 66. Such design results in the compression spring 75 applying a pivoting moment. For the embodiment shown in FIG. 4, the pivoting moment caused by the compression spring 75 is directed versus pivoting the holding and guiding unit 64 in radial outer direction. As a consequence for a movement of the cutting element 63 in radial inner direction manual forces have to be applied upon the holding and guiding unit 64. When resting or locking the holding and guiding unit 64, irrespective of the force of the compression spring 75 the unit remains in the radial inner end orientation. When releasing the resting and locking unit 70 by means of the resting or locking pin 71, the biased compression spring 75 moves the holding and guiding unit 64 in radial outer direction leading to a "snapping movement". In the most outer radial orientation of the holding and guiding unit 64 according to FIG. 4, the end region of the holding and guiding unit 64 adjacent to pin 65 abuts a stop element 89 of the circular ring segment 60.

As can be seen from FIG. 3, a circular ring-shaped closing disc 78 is located at the side of the cutting unit 45 opposite to the protrusion 48. The final nut 58 is built with a head 79 and a sleeve 80 having an outer thread and an inner through hole. The outer thread of sleeve 80 is threaded into a corresponding inner thread of through hole 53. When threading the sleeve 80 in the threaded hole 53, head 79 of final disc 78 is pressed against the front surface of the base body 52. The inner hole of head 79 and sleeve 80 guide the ejecting stem 56 for a sliding movement. For the assembly process, the ejecting stem 56 in its end region protruding out off base body 52 comprises a removable thickening 81 which might be used as an activating element for manual manipulation.

Figure 5:
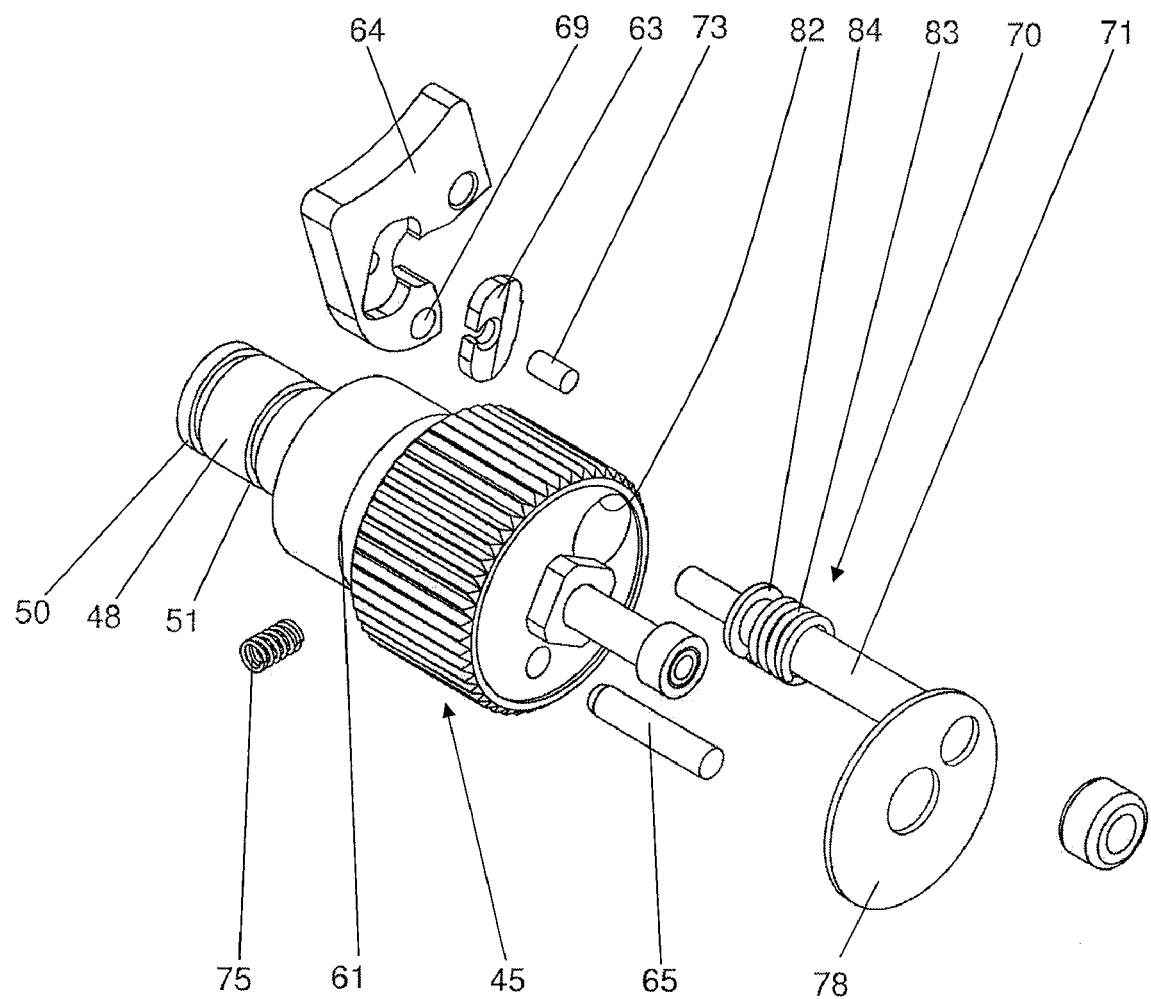
FIG. 5 shows the cutting unit according to FIGS. 3 and 4 in an explosional view.
Figure 6:
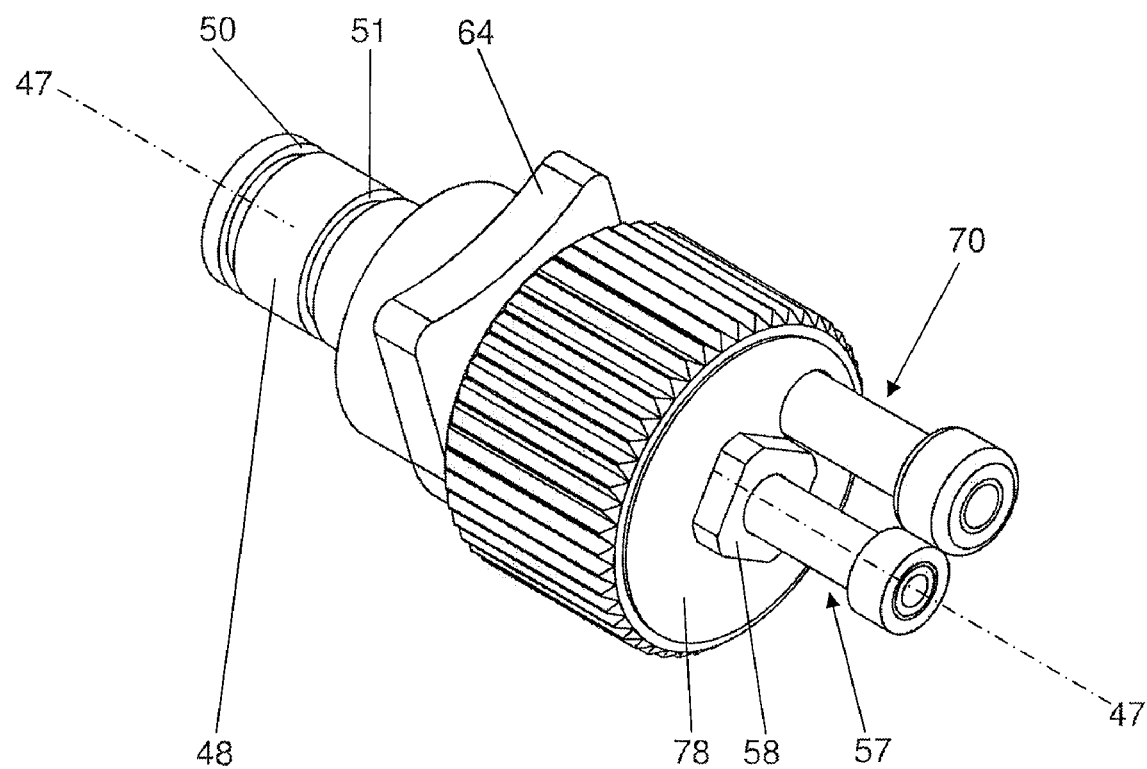
FIG. 6 shows the cutting unit according to FIGS. 3 to 5 in a three-dimensional view.

In the explosional view shown in FIG. 5, the nut 58 is shown when threaded into the base body 52 despite of the closing disc 78 being removed from the base body. The resting or locking pin 78 extends from the end region related with the closing disc 78 through bore 82 extending to the limiting wall 62. Bore 82 guides the resting or locking pin 71 in a direction parallel to the longitudinal axis 47-47 for sliding movement. There is a resting or locking spring 83 arranged coaxially with the resting or locking pin 71. The locking spring 83 with its first end region is linked with the closing disc 78, whereas an opposite end region is supported by a collar 84 of pin 71. In the assembled state of the locking pin 71 and the closing disc 78 the locking spring 83 presses the locking pin 71 versus the holding or guiding unit 64 such that in an end position or orientation bores 68, 69 are in coaxial positions. For such an alignment of bores 68, 69 the resting or locking pin 71 automatically enters bore 69 of the holding and guiding unit 64. For a removal of the locking function, the locking or resting pin 71 is manually pulled outside in the end region protruding from the closing disc 78 such that the locking or resting pin 71 is moved out off bore 69 of the holding and guiding unit 64. As a consequence, the compression spring 75 is permitted to move or pivot the holding and guiding unit 64 in radial outer direction.

Additionally to the aforementioned steps, a further removal of an insulation might be done as follows: the coaxial cable is introduced into the cutting unit 45 until the ejecting stem 56 comes into contact with the front surface of the axial cable. With a further movement of the coaxial cable, the ejecting stem 56 is pushed in an outermost position. Subsequent to such step the holding and guiding unit 64 is manually moved in radial inner direction unless the resting or locking pin 71 enters bore 69 caused by the resting or locking spring 83 resulting in a locking or resting function of the holding and guiding unit in its radial position. When pivoting the holding and guiding unit 64 in radial inner direction, the cutting element 63 cuts or carves one portion of the circumference in the outer sheet of the coaxial cable or an outer layer uncovered with the removal of an insulation in a former step. An entire carving or cutting in circumferential direction is provided by rotating the entire base body in the region of the protrusion 48 with respect to the pliers 1 around longitudinal axis 47-47 coinciding with a relative movement of the base body 52, the holding and guiding unit 64 and the cutting element 63 with respect to the coaxial cable. Such relative movement leads to a cutting or carving of the entire circumference with a rotation of 360°. However, it is also possible that the angle of rotation is larger than 360°.

In case of the base body 52 not being formed by one single piece but with a first part being fixedly connected with the pliers and building the seat for the coaxial cable and with a second part being rotatable with respect to the first part around a longitudinal axis 47-47, said second part carrying the cutting element 63 avoids a drilling of the cable during the cutting or carving of the entire circumference.

Figure 7:
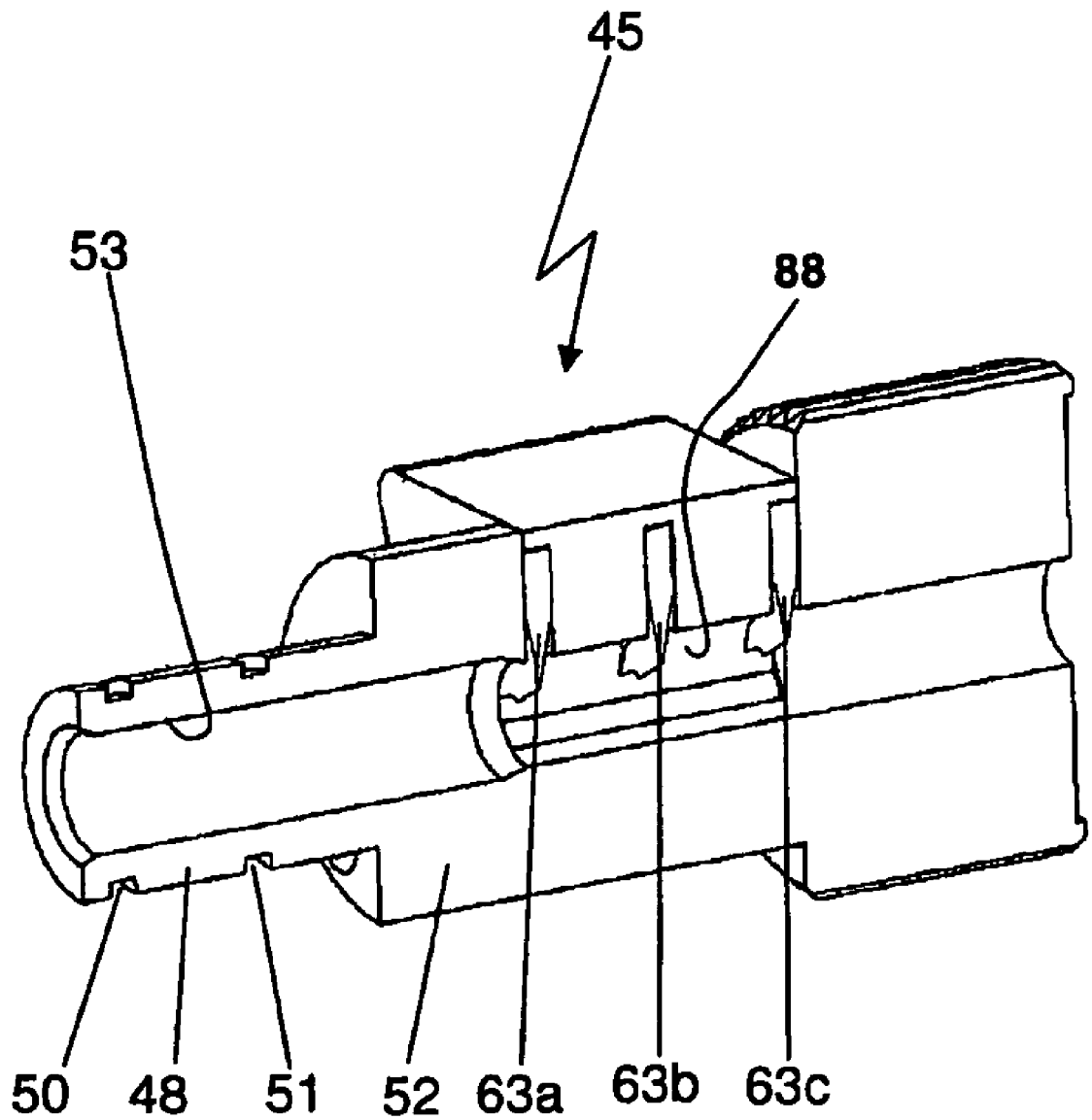
FIG. 7 shows an alternative embodiment of a cutting unit.

FIG. 7 shows another embodiment with a similar base construction but instead of one single cutting element of the cutting unit 45 having three cutting elements 63a, 63b and 63c being positioned one behind the other in axial direction. The distance of the cutting elements 63a, 63b and 63c from the front surface of the coaxial cable differs. Furthermore, the cutting element 63a, 63b and 63c might have different depths of cutting or carving, wherein in particular the cutting depth of cutting element 63c is smaller than the cutting depth of the cutting element 63b, which is again smaller than the cutting depth of the cutting element 63a.

Figure 8:
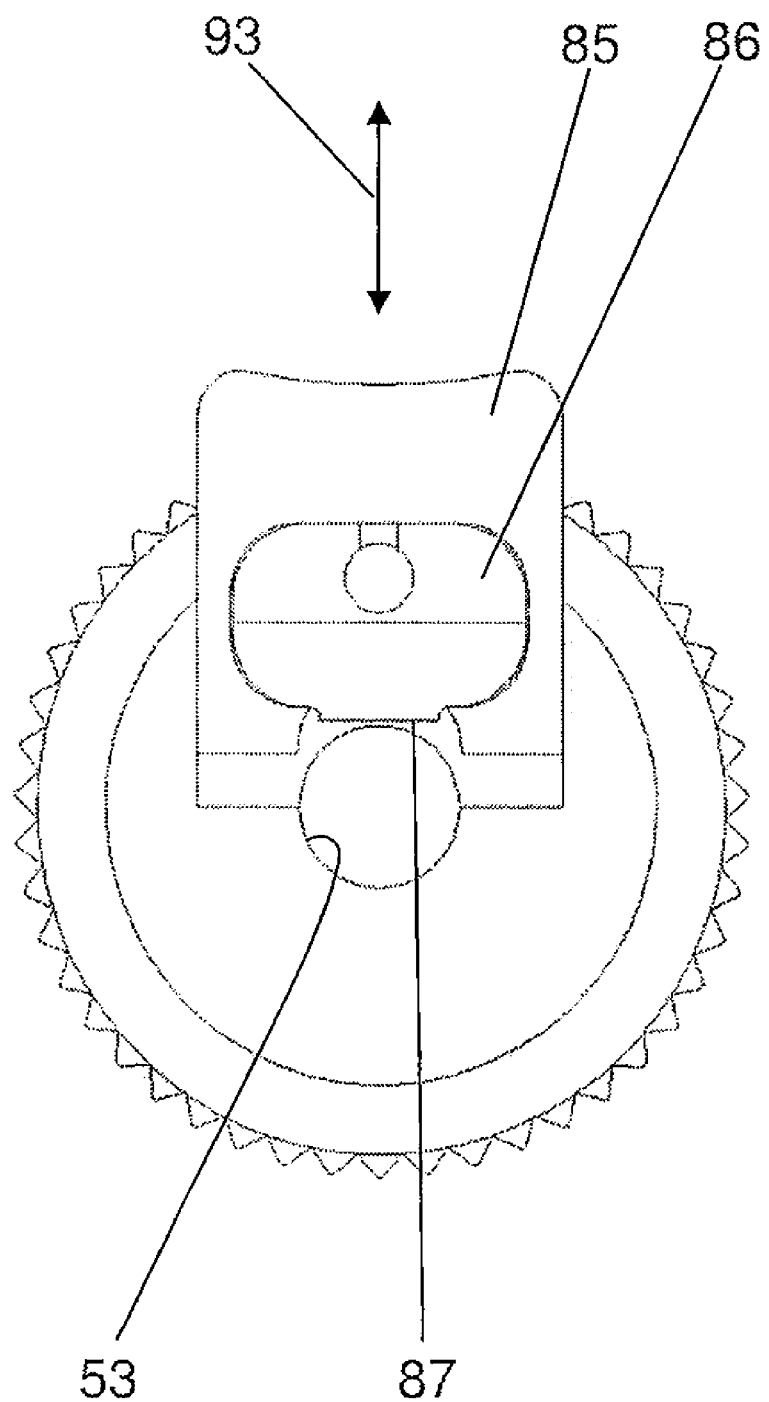
FIG. 8 shows another alternative embodiment of a cutting unit in a cross-section.

FIG. 8 in a more schematic view shows an alternative embodiment of a holding and guiding unit 85 with a cutting element 86. For that embodiment, the holding and guiding unit is not pivoted against the base body in the shown transverse plane but is guided with a translational degree of freedom in radial direction. Also such translational movement might be linked with the change of the energy level of a spring element. Also for such an embodiment, the holding and guiding unit 85 carries the cutting element 86 which—for the shown example—comprises a straight cutting edge 87. During a lifting movement 93, the radial distance of the cutting element 86 from a cable located in the through hole 53 is changed leading to a radial cutting or carving of the cable. By a rotational relative movement as explained for the former embodiment, a carving or cut covering the whole circumference is provided.

The through hole 53 and/or the bevel 54 build a seat 88 for a cable positioned in the pliers coming into contact with the cable when providing the cut or carving in radial direction and in circumferential direction.

The cutting unit 45 might be located at any position at the pliers 1. It is possible that a rotatable cutting unit 45 with coaxial orientation is located in an end region of one of the handles 4, 5.

With the working jaws 21, 22 and the cutting halves 30, 31 further cutting units 91, 92 might be built additionally to the cutting unit 45. A set of pliers 1 might be used with different or a plurality of head parts 2, wherein in such case the plurality of head parts 2 is used and activated by one and the same activating unit 3. The plurality of head parts might be adapted for the use for different applications where a removal of different layers or insulations of one and the same cable is necessary. Furthermore, it is possible that one head part comprises a plurality of separating units 26 and/or cutting units 45, 91, 92 for different cables. However, it is also possible to use a first head part for providing first steps of removing an insulation, whereas further steps of removing an insulation are performed under use of another head part with a different design. Furthermore, it is possible that a first head part is adapted for removing an insulation, whereas a second head part is used for crimping a plug with a coaxial cable, wherein an insulation of the crimped coaxial cable has been removed with the former head part. However, also combined embodiments are possible—e.g. a head part might also have a separating unit 26, a carving or cutting unit 45, 91, 92 and a unit for crimping. More details for units for crimping might be taken from the prior art of the applicant as described above.

Preferably, at first the separating unit 26 is used. Afterwards, the cutting unit 45 is used. Subsequently, the cutting units 91, 92 manipulate the coaxial cable.

Many variations and modifications may be made to the preferred embodiments of the invention without departing substantially from the spirit and principles of the invention. All such modifications and variations are intended to be included herein within the scope of the present invention, as defined by the following claims.

I claim:

1. Pliers comprising
a) a first cutting unit for stripping the insulation of an electrical cable, said first cutting unit being activated independent from hand levers of the pliers, and comprising
a seat for said cable and
a cutting element designed and arranged for carving or cutting an outer layer of said cable,
said cutting element being linked with said seat
with a radial degree of freedom for a movement of said cutting element in radial direction relative to said seat and
with a circumferential degree of freedom for a movement of said cutting element in circumferential direction relative to said seat
b) a unit selected from the group consisting of: a second cutting unit, a crimping unit, and a separating unit, the selected unit designed and arranged for being activated by said handles of said pliers.

2. Pliers of claim 1, wherein said seat comprises a bevel designed and arranged for centering said cable in said seat.

3. Pliers of claim 1, wherein said radial degree of freedom is a translational degree of freedom of said cutting element.

4. Pliers of claim 1, wherein said radial degree of freedom is a pivoting degree of freedom of said cutting element.

5. Pliers of claim 3, comprising a stop element designed and arranged for limiting the minimal radial distance of said cutting element from said seat.

6. Pliers of claim 4, comprising a stop element designed and arranged for limiting the minimal radial distance of said cutting element from said seat.

7. Pliers of claim 3, comprising a stop element designed and arranged for limiting the maximal radial distance of said cutting element from said seat.

8. Pliers of claim 4, comprising a stop element designed and arranged for limiting the maximal radial distance of said cutting element from said seat.

9. Pliers of claim 1, comprising a spring element, said spring element being linked with said cutting element for pressing said cutting element in radial inward direction.

10. Pliers of claim 3, comprising a spring element, said spring element being linked with said cutting element for pressing said cutting element in radial inward direction.

11. Pliers of claim 4, comprising a spring element, said spring element being linked with said cutting element for pressing said cutting element in radial inward direction.

12. Pliers of claim 1, comprising a spring element, said spring element being linked with said cutting element for pressing said cutting element in radial outward direction.

13. Pliers of claim 3, comprising a spring element, said spring element being linked with said cutting element for pressing said cutting element in radial outward direction.

14. Pliers of claim 4, comprising a spring element, said spring element being linked with said cutting element for pressing said cutting element in radial outward direction.

15. Pliers of claim 1, comprising one element selected from the group consisting of a resting unit and a locking unit, said element selected from said group consisting of a resting unit and a locking unit fixing the distance of said cutting element from said seat.

16. Pliers of claim 3, comprising one element selected from the group consisting of a resting unit and a locking unit, said element selected from said group consisting of a resting unit and a locking unit fixing the distance of said cutting element from said seat.

17. Pliers of claim 4, comprising one element selected from the group consisting of a resting unit and a locking unit, said element selected from said group consisting of a resting unit and a locking unit fixing the distance of said cutting element from said seat.

18. Pliers of claim 12, comprising one element selected from the group consisting of a resting unit and locking unit, said element selected from said group consisting of a resting unit and a locking unit fixing the distance of said cutting element from said seat.

19. Pliers of claim 13, comprising one element selected from the group consisting of a resting unit and a locking unit, said element selected from said group consisting of a resting unit and a locking unit fixing the distance of said cutting element from said seat.

20. Pliers of claim 14, comprising one element selected from the group consisting of a resting unit and a locking unit, said element selected from said group consisting of a resting unit and a locking unit fixing the distance of said cutting element from said seat.

21. Pliers of claim 18, said pliers being designed and arranged for building a feeding configuration, wherein in said feeding configuration said spring element presses said cutting element to a maximal distance from said seat, said cutting element being linked with said spring element such that under application of manual forces said cutting element is movable from said feeding configuration to a cutting configuration with an increased bias of said spring element, wherein in said cutting configuration said cutting element has a minimal distance from said seat, wherein said element selected from the group of a resting unit and a locking unit is designed and arranged for fixing the minimal distance of said cutting element from said seat.

22. Pliers of claim 19, said pliers being designed and arranged for building a feeding configuration, wherein in said feeding configuration said spring element presses said cutting element to a maximal distance from said seat, said cutting element being linked with said spring element such that under application of manual forces said cutting element is movable from said feeding configuration to a cutting configuration with an increased bias of said spring element, wherein in said cutting configuration said cutting element has a minimal distance from said seat, wherein said element selected from the group of a resting unit and a locking unit is designed and arranged for fixing the minimal distance of said cutting element from said seat.

23. Pliers of claim 20, said pliers being designed and arranged for building a feeding configuration, wherein in said feeding configuration said spring element presses said cutting element to a maximal distance from said seat, said cutting element being linked with said spring element such that under application of manual forces said cutting element is movable from said feeding configuration to a cutting configuration with an increased bias of said spring element, wherein in said cutting configuration said cutting element has a minimal distance from said seat, wherein said element selected from the group of a resting unit and a locking unit is designed and arranged for fixing the minimal distance of said cutting element from said seat.

24. Pliers of claim 1, comprising a locator, said locator having a positioning element designed and arranged for predetermining the axial distance of said cutting element from an end surface of said cable.

25. Pliers of claim 1, comprising an ejecting unit designed and arranged for ejecting an element selected from the group consisting of said cable and sliced portions of said cable at the end of the cutting process from said seat.

26. Pliers of claim 1, comprising a drive unit, said drive unit being designed and arranged for providing a relative movement between said cutting element and said seat.

27. Pliers of claim 1, comprising a plurality of cutting elements located in axially shifted planes, said plurality of cutting elements being linked with each other for a coupled movement of the plurality of said cutting elements relative to said seat.

28. Pliers of claim 1, comprising an exchangeable head portion.

29. Set including pliers according to claim 28 having a first head portion comprising a first cutting element and a second cutting unit being designed and arranged for being activated via handles of said pliers, said set comprising a second head portion comprising a crimping unit designed and arranged for being activated via said handles of said pliers.

30. Set of pliers of claim 29, wherein said first head portion comprises a separating unit designed and arranged for cutting the entire cross-section of said cable and for being activated via said handles of said pliers.

* * * * *